United States Patent
Lee et al.

(10) Patent No.: US 12,447,810 B2
(45) Date of Patent: Oct. 21, 2025

(54) BATTERY PACK MOUNTING STRUCTURE FOR VEHICLES

(71) Applicants: Hyundai Motor Company, Seoul (KR); Kia Corporation, Seoul (KR)

(72) Inventors: Won Hae Lee, Seoul (KR); Nam Ho Kim, Gwangmyeong-si (KR); Dae Ki Jeong, Hwaseong-si (KR); Su Jin Lee, Seoul (KR); Jun Woo Park, Hwaseong-si (KR); Jeong Hoon Han, Incheon (KR); Eun Bi Kim, Seoul (KR); Sun Keun Park, Seoul (KR); Byung Joo Chung, Gunpo-si (KR); Seung Hak Lee, Asan-si (KR); Seung Min Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 314 days.

(21) Appl. No.: 18/195,492

(22) Filed: May 10, 2023

(65) Prior Publication Data
US 2024/0190228 A1  Jun. 13, 2024

(30) Foreign Application Priority Data

Dec. 9, 2022 (KR) .................. 10-2022-0171640

(51) Int. Cl.
- B60K 1/04 (2019.01)
- B62D 21/15 (2006.01)
- H01M 10/613 (2014.01)
- H01M 10/625 (2014.01)
- H01M 10/6554 (2014.01)

(Continued)

(52) U.S. Cl.
CPC .............. *B60K 1/04* (2013.01); *B62D 21/157* (2013.01); *H01M 10/613* (2015.04); *H01M 10/625* (2015.04); *H01M 10/6554* (2015.04); *H01M 50/249* (2021.01); *H01M 50/262* (2021.01); *H01M 50/271* (2021.01); *B60K 2001/0438* (2013.01); *B60L 50/60* (2019.02); *B62D 25/025* (2013.01); *H01M 2220/20* (2013.01)

(58) Field of Classification Search
CPC ............ B60K 1/04; B60K 2001/0438; H01M 10/613; H01M 10/6554; H01M 10/625; H01M 50/249; H01M 50/262; H01M 50/271; B62D 21/157; B62D 25/025; B60L 50/60
See application file for complete search history.

(56) References Cited

U.S. PATENT DOCUMENTS

| | | | |
|---|---|---|---|
| 6,227,322 B1 * | 5/2001 | Nishikawa | B60R 16/04 180/68.5 |
| 9,227,582 B2 * | 1/2016 | Katayama | H01M 50/24 |
| 11,990,634 B1 * | 5/2024 | Lee | H01M 10/613 |

FOREIGN PATENT DOCUMENTS

KR   10-2014-0045778 A   4/2014

* cited by examiner

*Primary Examiner* — Edwin A Young
(74) *Attorney, Agent, or Firm* — Morgan, Lewis & Bockius LLP

(57) ABSTRACT

A battery pack mounting structure for vehicles, includes a frame side member extending in a front and rear direction on each side of a vehicle to form a chassis frame, a battery disposed to be overlapped horizontally on inside of both frame side members, and a battery case enclosing the battery therein, wherein a case side portion provided on a side of the battery case is coupled to a lower side of the frame side member.

14 Claims, 6 Drawing Sheets

(51) Int. Cl.
_H01M 50/249_ (2021.01)
_H01M 50/262_ (2021.01)
_H01M 50/271_ (2021.01)
_B60L 50/60_ (2019.01)
_B62D 25/02_ (2006.01)

BATTERY PACK MOUNTING STRUCTURE FOR VEHICLES

CROSS REFERENCE TO RELATED APPLICATION

The present application claims priority to Korean Patent Application No. 10-2022-0171640, filed Dec. 9, 2022, the entire contents of which is incorporated herein for all purposes by this reference.

BACKGROUND OF THE PRESENT DISCLOSURE

Field of the Present Disclosure

The present disclosure relates to a technique for mounting a battery pack required for an electric vehicle in a vehicle.

DESCRIPTION OF RELATED ART

A body-on-frame vehicle has a structure in which a vehicle body is mounted on the upper side of a chassis frame. More particularly, body-on-frame refers to a design in which a chassis frame provided with chassis parts necessary for a vehicle to move is the same while a body mounted on the upper side of the chassis frame may easily be changed to various states desired by a consumer.

When the body-on-frame structure as described above is applied to an electric vehicle, a battery pack is provided on the chassis frame side.

A battery pack generally consists of a battery module composed of battery cells and a battery case that surrounds, protects, and supports a plurality of battery modules.

Hereinafter, "battery" means a battery cell or battery module in a battery case.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery pack mounting structure for vehicles that makes it easy for passengers to get in and out of a vehicle and maximizes the passenger compartment space while effectively protecting batteries required for the vehicle to move in vehicles with a body-on-frame structure, so that the provided batteries are safely protected and the marketability of the vehicle is greatly enhanced.

In various aspects of the present disclosure, according to various exemplary embodiments of the present disclosure, there is provided a battery pack mounting structure for vehicles, including: a frame side member disposed long in a front-rear direction on each side of a vehicle to form a chassis frame of the vehicle; a battery disposed to be overlapped horizontally on an inside of both frame side members; and a battery case enclosing the battery therein, wherein a case side portion provided on a side of the battery case may be coupled to a lower side of the frame side member.

The battery case may include: an upper cover covering an upper side of the battery; and a case lower plate supporting a lower side of the battery, and the case side portion may include: a vertical section portion combined between the case lower plate and the upper cover and including a predetermined cross-sectional shape in a vertical direction thereof, and a horizontal section portion that protrudes from the vertical section portion in a transverse direction of the vehicle and is coupled to the lower side of the frame side member.

In the battery case, a cooling plate may be provided under the case lower plate, a lower side of the cooling plate may be covered by an under cover, and the under cover may be aligned with a minimum ground clearance.

A cover fastening bolt penetrating the under cover and the case lower plate may be fastened to the vertical section portion of the case side portion, and a lower end portion of a head of the cover fastening bolt may be aligned with the minimum ground clearance.

A lower end portion of the horizontal section portion of the case side portion may include a structure connected in a horizontal direction to an inclined connection portion formed to be inclined downwardly from the vertical section portion, and may be aligned with the minimum ground clearance.

A sleeve contacting with the lower side of the frame side member may be provided on the horizontal section portion, and a case mounting bolt penetrating the sleeve may be fastened to the frame side member.

The sleeve may include: a protruding spare portion protruding upwards from the horizontal section portion, and an insertion support portion inserted into the horizontal section portion, wherein the insertion support portion may be supported by a plurality of spaced-apart support walls forming the horizontal section portion.

The protruding spare portion of the sleeve may be formed to be 7 mm or more than 7 mm.

The insertion support portion of the sleeve may be formed to be 15 mm or more than 15 mm.

The lower end portion of the horizontal section portion may be provided with a bolt through hole through which the head of the case mounting bolt passes, and the plurality of support walls of the horizontal section portion supporting the sleeve may be formed to be in parallel spaced upwards from the lower end portion of the horizontal section portion.

A horizontal length of the horizontal section portion may be so that an external end portion of the horizontal section portion does not protrude beyond an external end portion of the frame side member in a state in which the horizontal section portion is coupled to the lower side of the frame side member by the case mounting bolt.

The horizontal length of the horizontal section portion may be set to form a "head space" with a width of 10 to 20 mm around the head of the case mounting bolt in a state in which the horizontal section portion is coupled to the lower side of the frame side member by the case mounting bolt.

A head clearance height of 5 to 10 mm may be provided between the lower end portion of the horizontal section portion and the head of the case mounting bolt in a state in which the horizontal section portion is coupled to the lower side of the frame side member by the case mounting bolt.

The head of the case mounting bolt may include a height of 15 to 20 mm, and a diameter thereof may be 30 to 35 mm.

An upper cover may be provided on a lower side of the battery case, a cover fastening bolt fastened through the under cover may be fastened to the vertical section portion of the case side portion, and the under cover, a lower end portion of a head of the cover fastening bolt, and a lower end portion of the horizontal section portion of the case side portion may be aligned with a minimum ground clearance.

According to an exemplary embodiment of the present disclosure, it is possible to safely protect batteries provided in a vehicle and greatly enhance the marketability of the vehicle by making it easy for passengers to get in and out of the vehicle and maximizing the passenger compartment space while effectively protecting the batteries required for the vehicle to move in vehicles with a body-on-frame structure.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
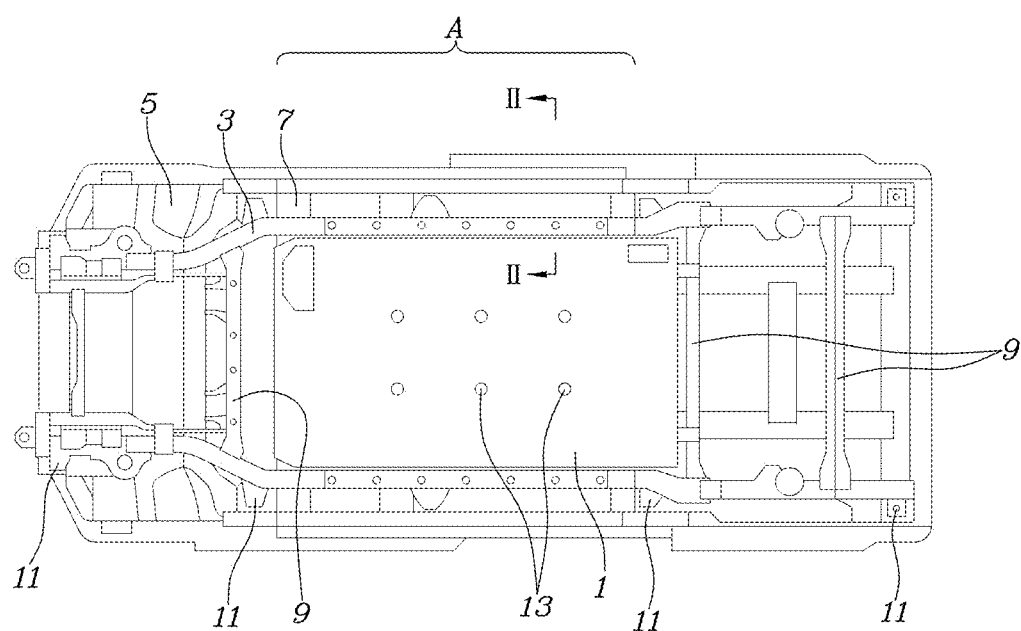
FIG. 1 is a view showing an example in which a battery pack mounting structure for vehicles according to an exemplary embodiment of the present disclosure is applied, illustrating a state in which a chassis frame and battery are mounted on the lower side of a vehicle body.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, with the same or similar elements being assigned the same reference numerals regardless of numerals used in the drawings, and overlapping descriptions thereof will be omitted.

The expressions "module" and "part" for the elements used in the following description are provided or mixed in consideration of only the ease of writing the specification, and do not have distinct meanings or roles by themselves.

In describing the exemplary embodiments included in the present specification, if it is determined that detailed descriptions of related known technologies may obscure the gist of the exemplary embodiments included in the present specification, the detailed description thereof will be omitted. Furthermore, it should be understood that the accompanying drawings are only for easy understanding of the exemplary embodiments included in the present specification, and the technical idea included in the present specification is not limited by the accompanying drawings, and the present disclosure covers all changes, equivalents and substitutes within the spirit and scope of the present disclosure.

Terms including an ordinal number, such as first, second, etc., may be used to describe various elements, but the elements are not limited by the terms. These terms are used only for distinguishing one element from another.

When an element is referred to as being "connected" to another element, it should be understood that the other element may be directly connected to the other element, but other element(s) may exist in between. On the other hand, when it is said that a certain element is "directly connected" to another element, it should be understood that no other element is present in the middle.

The singular expression includes the plural expression unless the context clearly dictates otherwise.

In the present specification, the terms "comprise", "include", or "have" are intended to indicate that there is a feature, number, step, action, element, portion, or combination thereof described on the specification, and it is to be understood that the present disclosure does not exclude the possibility of the presence or the addition of one or more other features, numbers, steps, actions, elements, parts, or combinations thereof.

FIG. 1 is a view showing an example in which a battery pack 1 mounting structure for vehicles according to an exemplary embodiment of the present disclosure is applied. FIG. 1 shows a state in which a vehicle body 5 is coupled to the upper side of a chassis frame 3 and the battery pack 1 is mounted on the chassis frame 3 at the center portion of the vehicle body 5, observed from the lower side of a vehicle.

The chassis frame 3 includes: a frame side member 7 disposed long in the front-rear direction on each side of the vehicle; and a plurality of frame cross members 9 connecting the two frame side members 7 in the lateral direction of the vehicle.

The vehicle body 5 is located on the upper side of the chassis frame 3, and as shown, the chassis frame 3 and the vehicle body 5 are coupled by a plurality of body mounting portions 11.

The vehicle body 5 mounted on the upper side of the chassis frame 3 may be configured in various forms to meet the needs of consumers.

As will be described later, both sides of the battery pack 1 are coupled to the frame side members 7, respectively, of the chassis frame 3, and the battery pack 1 may be securely coupled to the vehicle body 5 by a plurality of battery through-bolts 13 penetrating the center portion of the battery pack 1 and coupled to the vehicle body 5.

Hereinafter, the battery pack mounting structure of the present disclosure to be mentioned relates to section A of FIG. 1.

For reference, hereinafter, with respect to the battery pack mounting structure for vehicles of the present disclosure, the part described mainly with attention to the horizontal arrangement relationship of parts, the part described mainly with attention to the vertical arrangement relationship of parts, the part described mainly with attention to the structure of the battery case, and the part described mainly with attention to the structure of the frame side member will be described in turn.

Thus, redundant descriptions may be made for some components.

Figure 2:
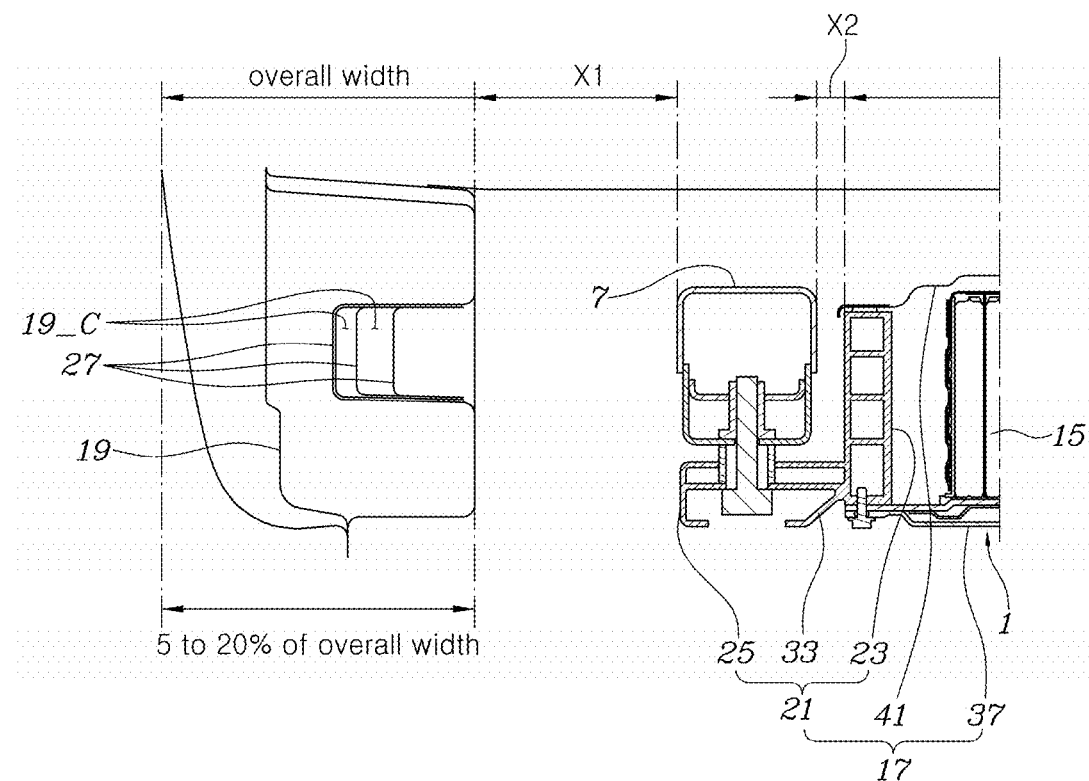
FIG. 2 is a cross-sectional view taken along line II-II of FIG. 1, illustrating the horizontal arrangement of parts.

FIG. 2 mainly shows the horizontal arrangement relationship of parts constituting the battery pack mounting structure for vehicles of the present disclosure. The structure of the exemplary embodiment includes: the frame side member 7 forming the chassis frame 3 and disposed long in the front and rear direction on each side of the vehicle; a battery 15 disposed to be overlapped horizontally on the inside of the two frame side members 7; a battery case 17 enclosing the battery 15 and fastened to the lower side of the frame side member 7; and a body side sill 19 disposed to be overlapped horizontally on the outside of the frame side member 7.

That is, between the two frame side members 7, the battery 15 is disposed to be overlapped in the horizontal direction while covered in the battery case 17, and on the outside of the frame side member 7, the body side sill 19 is disposed to be overlapped in the horizontal direction, so that the body side sill 19, the frame side member 7, and the battery 15 are disposed to overlap each other in the horizontal direction thereof.

From the point of view of the battery 15, this is a configuration in which the body side sill 19 and the frame side member 7 protect the battery 15 in multiple ways against an external impact force acting in the horizontal direction thereof.

The body side sill 19 is provided to be spaced from the frame side member 7 by the space of a vehicle body deformation section X1 provided so that the body side sill 19 may be deformed without contacting with the frame side member 7 in the event of an external impact.

Furthermore, a plurality of closed sections 19_C are formed inside the body side sill 19 to absorb shock and suppress deformation upon external impact.

Thus, when an external impact force acts on the vehicle, the body side sill 19 absorbs the impact by itself while suppressing deformation to a certain extent. For a greater impact, the body side sill 19 itself is deformed and pushed into the body deformation section interval Y1, absorbing the impact, so that the shock is prevented from being transferred to the frame side member 7 and the battery 15 as much as possible.

To ensure the shock resistance and shock absorption function as described above, the width from the inside of the body side sill 19 to the outside of the vehicle body 5 is set to 5 to 20% of the overall width of the vehicle.

Furthermore, the vehicle body deformation section X1 is set to 60% or more of the width of the body side sill 19 or 40 to 60% of the distance from the body side sill 19 to the battery 15.

That is, as previously described, the vehicle body deformation section X1 needs to be set to the width described above so that the body side sill 19 is deformed and pushed into the vehicle to provide adequate shock absorption.

Meanwhile, the battery case 17 includes a case side portion 21 forming a side surface of the battery case 17, and the case side portion 21 includes: a vertical section portion 23 forming a side surface of the battery case 17 and includes a predetermined cross-sectional shape in a vertical direction thereof; and a horizontal section portion 25 coupled to the lower side of the frame side member 7 as a cross section protruding orthogonally from the vertical section portion 23 in the transverse direction of the vehicle.

At the present time, the frame side member 7 is provided to be spaced from the vertical section portion 23 by the space of a frame deformation section provided so that the frame side member 7 may be deformed without contacting with the vertical section portion 23 of the case side portion 21 in the event of an external impact.

That is, in the battery case 17, the case side portion 21 including an L-shaped cross section forms each side of the battery case 17, and the portion protruding to the side of the case side portion 21 is coupled to the lower side of the frame side member 7 so that the cross section protruding upward from the case side portion 21 is spaced from the frame side member 7 in the horizontal direction by the space of a frame deformation section X2.

Accordingly, the frame side member 7 is spaced from the body side sill 19 by the space of the vehicle body deformation section X1 on the outside of the vehicle, and is spaced from the vertical section portion 23 of the case side portion 21 by the space of the frame deformation section X2 on the interior of the vehicle.

The frame deformation section X2 is configured to prevent shock transfer to the battery 15 as long as the body side sill 19 is deformed within the frame deformation section X2 by, for example, an external impact force, even when the body side sill 19 is deformed and the shock is transferred to the frame side member 7 to cause the frame side member 7 to be deformed as well.

The frame deformation section X2 is also configured to facilitate assembly when the battery pack 1 is actually assembled to be coupled to the chassis frame 3.

The configuration of the exemplary embodiment of the present disclosure as described above may be expressed as follows.

That is, the battery pack mounting structure for vehicles of the present disclosure includes: the frame side member 7 disposed long in the front and rear direction on each side of the vehicle to form the chassis frame 3; the body side sill 19 spaced from the frame side member 7 by the space of a predetermined vehicle body deformation section X1 on the outside of the vehicle; and the battery case 17 including the vertical section portion 23 spaced from the frame side member 7 by the space of a predetermined frame deformation section X2 on the interior of the vehicle, and including the battery 15 therein.

The frame side member 7 and the body side sill 19 are horizontally overlapped on each side of the vehicle with the battery case 17 as the center.

The battery case 17 includes the case side portion 21 including the vertical section portion 23 and forming a side surface of the battery case 17, the case side portion 21 includes the horizontal section portion 25 protruding long in the transverse direction of the vehicle from the lower side of the vertical section portion 23, and the horizontal section portion 25 is coupled to the lower end portion of the frame side member 7.

Inside the body side sill 19, side sill reinforcing panels 27 forming at least one closed section 19_C are provided to absorb shock and suppress deformation in the event of an external impact.

Figure 3:
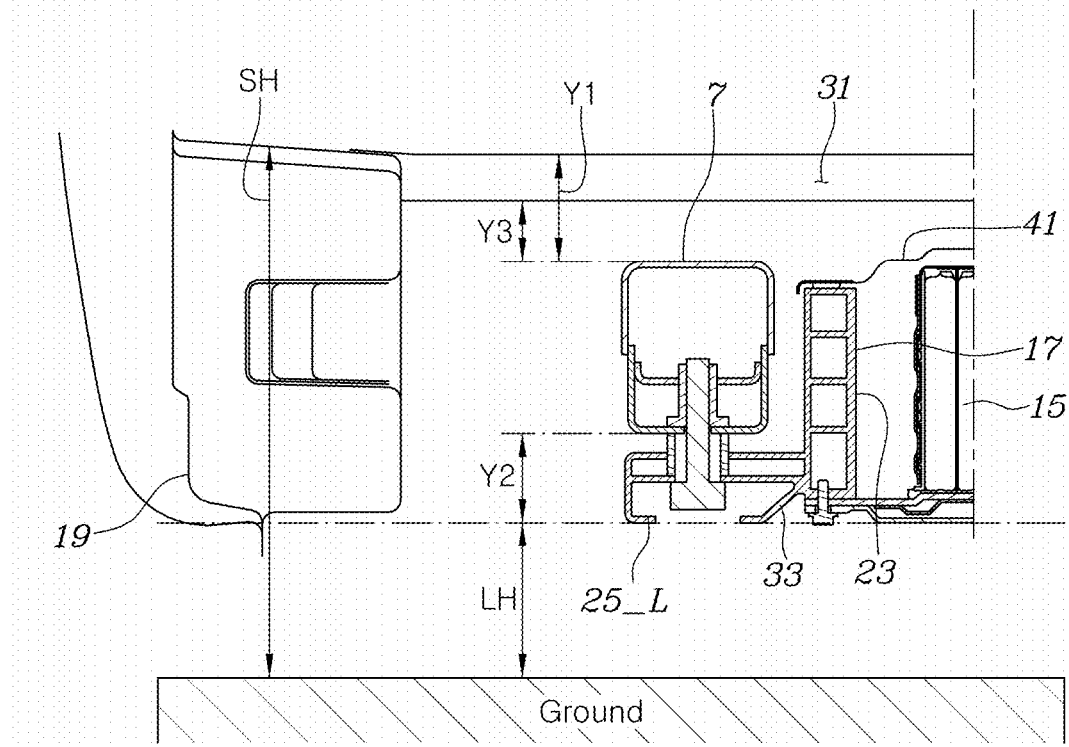
FIG. 3 is a cross-sectional view taken along line II-II of FIG. 1, illustrating the vertical arrangement of parts.

FIG. 3 mainly shows the vertical arrangement relationship of the portions forming the battery pack mounting structure for vehicles of the present disclosure. The structure of the present exemplary embodiment includes: the frame side member 7 of the chassis frame 3 provided so that the upper end portion thereof is located at a position spaced downward by a predetermined reference downward interval Y1 from a step height SH set in consideration of the ease of getting in and out by passengers; the battery case 17 provided so that the battery 15 accommodated therein overlap the frame side member 7 in the horizontal direction thereof, the case side portion 21 forming the side of the battery case 17, coupled to the lower side of the frame side member 7, and including a lower end portion aligned with a minimum ground clearance LH of the vehicle; a case lower plate 29 that forms the battery case 17 while supporting the lower side of the battery 15 and is disposed at a position spaced upwards from the minimum ground clearance LH.

At the present time, the step height SH is the height of a vehicle at which a person may enter on his or her own without the help of equipment, etc., and is set as low as possible for easy getting in and out.

The minimum ground clearance LH of the vehicle is set as the minimum distance between the lowest point of the vehicle body and the ground to protect the lower portion of the vehicle and the battery in consideration of the condition of the road on which the vehicle is mainly driven.

The frame side member 7 and the battery case 17 are disposed between the minimum ground clearance LH and the step height SH. To be specific, the frame side member 7 is disposed below the step height SH by the reference downward interval Y1, and the lower end portion of the battery case 17 is aligned with the minimum ground clearance LH.

The reference downward interval Y1 is a combination of the thickness of a body floor 31 whose upper end portion is aligned with the step height SH and a vehicle body gap Y3 formed between the body floor 31 and the frame side member 7.

For example, the body floor 31 may include a thickness of about 25 mm to provide rigidity required by the vehicle, while the vehicle body gap Y3 may be set to 5 to 15 mm to play a role such as avoiding interference between parts occurring during vehicle production and maintenance.

Meanwhile, the case side portion 21 forming the battery case 17 includes: the vertical section portion 23 forming a side surface of the battery case 17 and includes a long cross-sectional shape in the vertical direction thereof; and the horizontal section portion 25 coupled to the lower side of the frame side member 7 as a cross section protruding orthogonally from the vertical section portion 23 in the transverse direction of the vehicle. A lower end portion 25_L of the horizontal section portion 25 is aligned with the minimum ground clearance LH.

Because the lower end portion 25_L of the horizontal section portion 25 of the case side portion 21 is connected in the horizontal direction to an inclined connection portion 33 extending obliquely downwardly from the lower end portion of the vertical section portion 23, the lower end portion 25_L may be aligned with the minimum ground clearance LH below the vertical section portion 23.

Thus, the frame side member 7 may be provided so that the lower end portion thereof is located at a point obtained by adding the height of the horizontal section portion 25 of the case side portion 21 to the minimum ground clearance LH from the ground.

The frame side member 7 is provided with a frame depression portion 35 locally depressed upward in the portion to which the case side portion 21 is coupled in the longitudinal direction of the vehicle.

Figure 4:
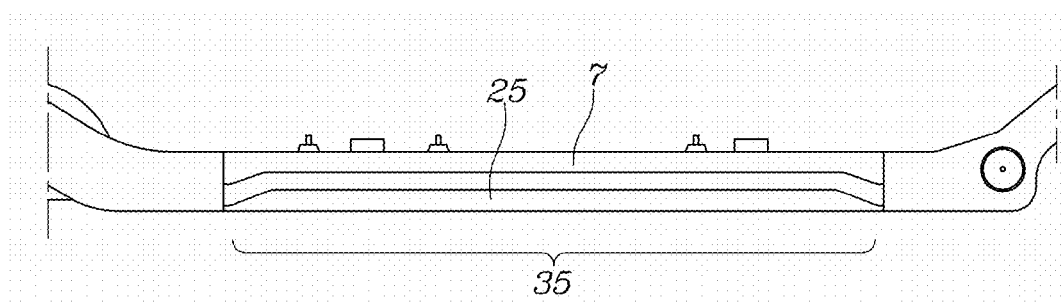
FIG. 4 is a view of part A of FIG. 1 observed from the side.

That is, as shown in FIG. 4, the frame side member 7 includes the frame depression portion 35 depressed upward at the lower side thereof, and the horizontal section portion 25 of the case side portion 21 is coupled to the frame depression portion 35.

Accordingly, even when the horizontal section portion 25 of the battery case 17 is coupled to the lower side of the frame side member 7, the minimum ground clearance LH of the vehicle does not substantially decrease.

The configuration of the present disclosure as described above includes a structure in which the battery 15 is overlapped with the frame side member 7 in the horizontal direction and disposed at almost the same height, and the horizontal section portion 25 of the battery case 17 is coupled to the frame depression portion 35 of the frame side member 7, so that the distance from the minimum ground clearance LH to the step height SH may be minimized by minimizing unnecessary space due to the mounting of the battery pack 1. That is, due to the compact mounting structure for the battery pack 1, the step height SH may ultimately be lowered to ensure easy getting in and out by passengers and accommodate shapes for more diverse utilizes of the vehicle body coupled to the upper side of the chassis frame 3.

Meanwhile, the lower end portion of the body side sill 19 of the vehicle body 5 provided on the upper side of the frame side member 7 is aligned with the minimum ground clearance LH.

That is, the vehicle body 5 is mounted on the upper side of the chassis frame 3 including the frame side members 7, and as previously described, the body side sill 19 forming a portion of the vehicle body 5 is disposed on the outside of the frame side member 7 to be spaced from the frame side member 7 with the vehicle body deformation section interval Y1 interposed therebetween. Furthermore, the lower end portion of the body side sill 19 is aligned with the minimum ground clearance LH.

Meanwhile, the battery case 17 is provided with an under cover 37 below the case lower plate 29, and the under cover 37 is aligned with the minimum ground clearance LH.

Thus, the lower end portion of the body side sill 19, the lower end portion of the horizontal section portion 25 of the case side portion 21, and the under cover 37 are all provided to be aligned with the minimum ground clearance LH.

The configuration of the exemplary embodiment of the present disclosure as described above may be expressed as follows.

That is, the battery pack mounting structure for vehicles of the present disclosure includes: the frame side member 7 of the chassis frame 3 provided so that the upper end portion thereof is located at a position spaced downward by a predetermined reference downward interval Y1 from the step height SH of the vehicle while the lower end portion thereof is located at a position spaced upward by a predetermined reference upward interval Y2 from the minimum ground clearance LH of the vehicle; the battery 15 disposed to overlap the frame side member 7 in the horizontal direction thereof, the battery case 17 mounted on the frame side member 7 while enclosing the battery 15, and the lower end portion thereof is aligned with the minimum ground clearance LH.

The battery case 17 includes: the case lower plate 29 supporting the lower side of the battery 15; a cooling plate 39 provided under the case lower plate 29; the under cover 37 covering the lower side of the cooling plate 39; an upper cover 41 covering the upper side of the battery; and the case side portion 21 combined between the case lower plate 29 and the upper cover 41 and forming the side of the battery case 17.

The under cover 37 of the battery case 17 is aligned with the minimum ground clearance LH.

Furthermore, the case side portion 21 includes: the vertical section portion 23 formed in a long cross-sectional shape in the vertical direction between the case lower plate 29 and the upper cover 41; and the horizontal section portion 25 formed by protruding from the vertical section portion 23 in the lateral direction of the vehicle.

The lower end portion of the horizontal section portion 25 of the case side portion 21 is connected in the horizontal direction to the inclined connection portion 33 extending obliquely downwardly from the lower end portion of the vertical section portion 23, and is aligned with the minimum ground clearance LH.

The reference upward interval Y2 equals the height of the horizontal section portion 25 of the case side portion 21.

Furthermore, the reference downward interval Y1 is a combination of the thickness of the body floor 31 whose top is aligned with the step height SH and the vehicle body gap Y3 formed between the body floor 31 and the frame side member 7.

The frame side member 7 is formed long in the longitudinal direction of the vehicle, and in the portion of the frame side member 7 to which the case side portion 21 is coupled, the frame depression portion 35 in which the lower side thereof is depressed upward is provided so that the lower end portion of the case side portion 21 of the battery case 17 coupled to the frame depression portion 35 is aligned with the minimum ground clearance LH.

Figure 5:
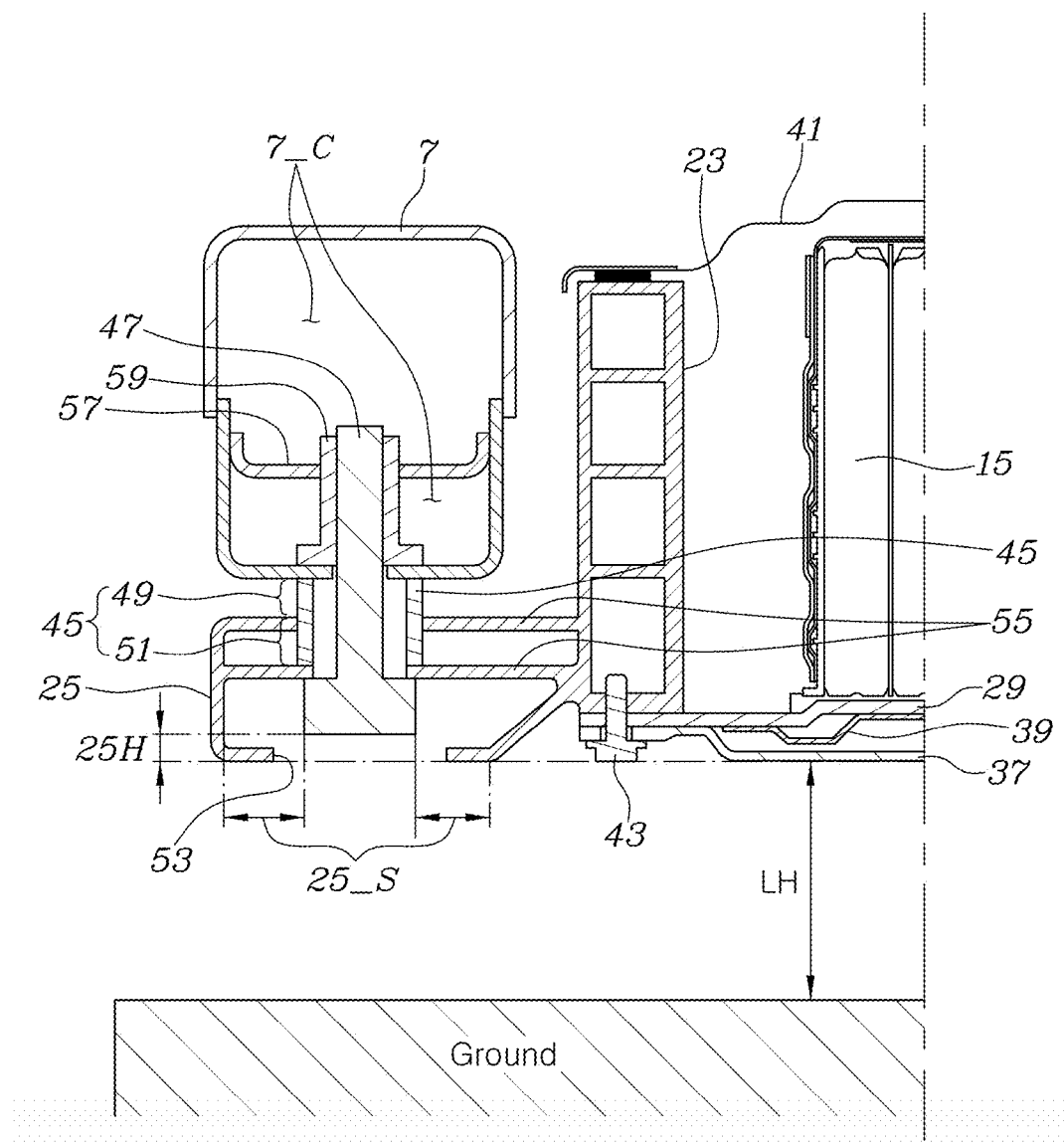
FIG. 5 is a cross-sectional view taken along line II-II of FIG. 1, illustrating the structure of a battery case.

FIG. 5 mainly shows the structure of the battery case 17 forming the battery pack 1 mounting structure for vehicles of the present disclosure. The structure includes: the frame side member 7 forming the chassis frame 3 and disposed long in the front and rear direction on each side of the vehicle; the battery 15 disposed to be overlapped horizontally on the inside of the two frame side members 7; and the battery case 17 enclosing the battery 15. The case side portion 21 provided on the side of the battery case 17 is coupled to the lower side of the frame side member 7.

The battery case 17 is provided with the upper cover 41 surrounding the upper side of the battery 15, and the case lower plate 29 supporting the lower side of the battery 15.

The case side portion 21 includes: the vertical section portion 23 formed in a long cross-sectional shape in the vertical direction and combined between the case lower plate 29 and the upper cover 41; and the horizontal section portion 25 protruding from the vertical section portion 23 in the lateral direction of the vehicle and is coupled to the lower side of the frame side member 7.

That is, in the case side portion 21, the horizontal section portion 25 is coupled to the lower side of the frame side member 7, and the vertical section portion 23 is disposed on the inside of the frame side member 7.

Furthermore, in the battery case 17, the cooling plate 39 is provided under the case lower plate 29, the lower side of the cooling plate 39 is covered by the under cover 37, and the under cover 37 is aligned with the minimum ground clearance LH.

A cooling passage through which a refrigerant flows is formed between the cooling plate 39 and the case lower plate 29 to circulate the refrigerant through the cooling passage, providing power to the battery 15 located above the case lower plate 29.

Meanwhile, the under cover 37 is configured to surround and protect the lower side of the cooling plate 39.

A cover fastening bolt 43 penetrating the under cover 37 and the case lower plate 29 is fastened to the vertical section portion 23 of the case side portion 21, and the lower end portion of the head of the cover fastening bolt 43 is aligned with the minimum ground clearance LH.

That is, the case lower plate 29 and the under cover 37 are combined under the vertical section portion 23 of the case side portion 21 by the cover fastening bolt 43 in an overlapping state. Furthermore, as the portion of the under cover 37 fastened by the cover fastening bolt 43 is locally bent upward and pressed against the case lower plate 29 while the rest of the under cover 37 protrudes relatively downward to form a space surrounding the cooling plate 39, the head of the cover fastening bolt 43 and the lower end portion of the under cover 37 may be commonly aligned with the minimum ground clearance LH.

The lower end portion of the horizontal section portion 25 of the case side portion 21 is connected in the horizontal direction to the inclined connection portion 33 formed obliquely downwardly from the vertical section portion 23, and is aligned with the minimum ground clearance LH.

That is, although the horizontal section portion 25 of the case side portion 21 is generally shaped to protrude in the horizontal direction from the vertical section portion 23, the lower side of the horizontal section portion 25 includes a shape extending slightly downward by the inclined connection portion 33, so that the lower end portion of the horizontal section portion 25 may be aligned with the minimum ground clearance LH.

Thus, on both sides of the cover fastening bolt 43, the lower end portion of the horizontal section portion 25 and the under cover 37 are aligned with the minimum ground clearance LH to avoid that only the head of the cover fastening bolt 43 is intensively impacted by protrusions or scattering objects on the road and to disperse the impact.

A sleeve 45 contacting with the lower side of the frame side member 7 is provided on the horizontal section portion 25, and a case mounting bolt 47 penetrating the sleeve 45 is fastened to the frame side member 7.

That is, the horizontal section portion 25 of the case side portion 21 is coupled to the frame side member 7 by the case mounting bolt 47, and the case mounting bolt 47 is fastened to the frame side member 7 by penetrating the sleeve 45 provided on the horizontal section portion 25.

The sleeve 45 includes a protruding spare portion 49 protruding upwards from the horizontal section portion 25, and an insertion support portion 51 inserted into the horizontal section portion 25. The insertion support portion 51 is supported by a plurality of spaced-apart support walls forming the horizontal section portion 25.

Because the length of the protruding spare portion 49 may be relatively easily adjusted by replacing the sleeve 45 or polishing the upper end portion of the sleeve 45, the height at which the battery case 17 is coupled to the frame side member 7 may also be easily adjusted, making it possible to easily absorb assembly tolerances, etc. of the battery case 17.

The protruding spare portion 49 of the sleeve 45 is formed to be 7 mm or more, and the insertion support portion 51 of the sleeve 45 is formed to be 15 mm or more than 15 mm.

The insertion support portion 51 of the sleeve 45 is a portion that is configured to determine coupling stiffness between the sleeve 45 and the horizontal section portion 25, and the insertion support portion 51 is formed to be 15 mm or more as described above to ensure a solid coupling of the sleeve 45.

In the exemplary embodiment of the present disclosure, the lower end portion 25_L of the horizontal section portion 25 includes a bolt through hole 53 through which the head of the case mounting bolt 47 passes, and the plurality of support walls of the horizontal section portion 25 supporting the sleeve 45 are formed to be in parallel spaced upwards from the lower end portion 25_L of the horizontal section portion 25.

Meanwhile, the horizontal length of the horizontal section portion 25 is so that the external end portion of the horizontal section portion 25 does not protrude beyond the external end portion of the frame side member 7 in a state in which the horizontal section portion 25 is coupled to the lower side of the frame side member 7 by the case mounting bolt 47.

This is to enable the frame side member 7 to damp and absorb shock first rather than the horizontal section portion 25 in the event of an external impact, ultimately protecting the battery 15 accommodated in the battery case 17.

The horizontal length of the horizontal section portion 25 is set to form a "head space" with a width of 10 to 20 mm around the head of the case mounting bolt 47 in a state in which the horizontal section portion 25 is coupled to the lower side of the frame side member 7 by the case mounting bolt 47.

In other words, the horizontal length of the horizontal section portion 25 is determined in consideration of the fact that the above-described level of head space 25_S is required for the bolt mounting surface of the case mounting bolt 47 to be practically provided on the horizontal section portion 25 when considering a curvature forming the horizontal section portion 25 and machining allowance.

A head clearance height 25_H of 5 to 10 mm is provided between the lower end portion of the horizontal section portion 25 and the head of the case mounting bolt 47 in a state in which the horizontal section portion 25 is coupled to the lower side of the frame side member 7 by the case mounting bolt 47.

This makes it possible to effectively prevent the head of the case mounting bolt 47 from being damaged by protrusions or scattering objects on the road.

The head of the case mounting bolt 47 includes a height of, for example, 15 to 20 mm, the diameter thereof is set to a level of 30 to 35 mm, and the number thereof is adjusted, so that the load of the battery accommodated in the battery case 17 may be adequately handled.

Figure 6:
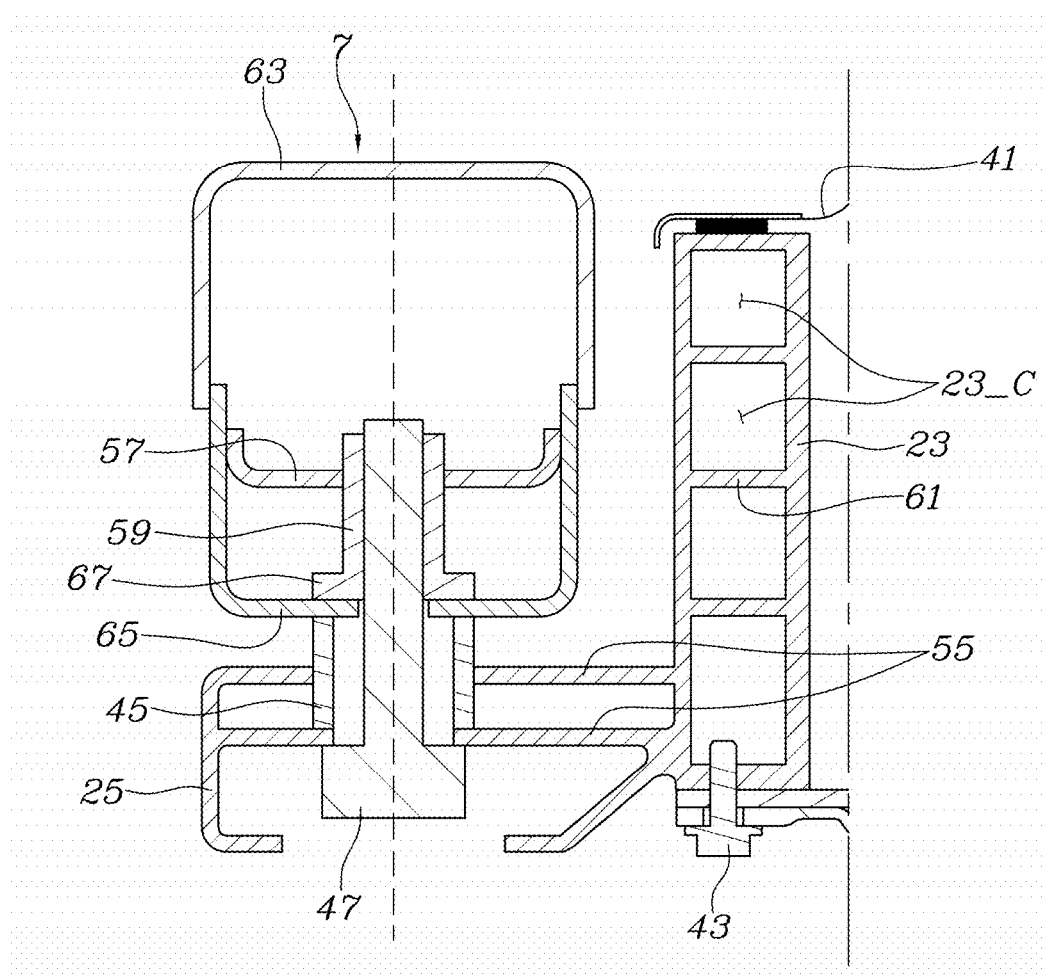
FIG. 6 is a cross-sectional view taken along line II-II of FIG. 1, illustrating the structure of a frame side member.

FIG. 6 mainly shows the structure of the frame side member 7 forming the battery pack mounting structure for vehicles according to an exemplary embodiment of the present disclosure. The structure includes: the frame side member 7 forming the chassis frame 3 and disposed long in the front and rear direction on each side of the vehicle; the battery 15 disposed to be overlapped horizontally on the inside of the two frame side members 7; and the battery case 17 enclosing the battery 15 and is coupled to the frame side member 7. The cross section of the frame side member 7 forms a plurality of closed sections 7_C.

That is, a frame reinforcing panel 57 is provided inside the frame side member 7 to form the plurality of closed sections 7_C.

Furthermore, a lock 59 to which a case mounting bolt 47 for coupling the battery case 17 to the frame side member 7 is fastened is provided to be supported by the frame reinforcing panel 57.

The frame reinforcing panel 57 is provided to form a horizontal partition in the frame side member 7, and the lock 59 is provided in a state of penetrating the frame reinforcing panel 57 long in the vertical direction so that the case mounting bolt 47 fastened through the frame side member 7 from below is screwed.

Accordingly, the frame side member 7 includes a more robust cross-sectional structure by the frame reinforcing panel 57 and the lock 59, and thus may provide greater rigidity against an external impact.

The lock 59 is disposed at the center portion of the cross section of the frame side member 7.

That is, because the frame side member 7 is symmetrically disposed on each side of the chassis frame 3, when the lock 59 is disposed at the center portion of the cross section of the frame side member 7 as described above, the frame side member 7 on each side of the chassis frame 3 may be jointly used.

Of course, when it is difficult to use the frame side members 7 jointly due to the structure of a vehicle, the lock 59 may be provided at a position slightly out of the center portion of the frame side member 7.

The lock 59 is provided to a length so that the screwed length of the case mounting bolt 47 is 9 mm or more, to ensure strong coupling rigidity with the case mounting bolt 47.

The battery case 17 is provided with: the upper cover 41 surrounding the upper side of the battery 15; the case lower plate 29 supporting the lower side of the battery 15; and the case side portion 21 provided between the upper cover 41 and the case lower plate 29 and forming the side of the battery case 17.

The case side portion 21 includes: the vertical section portion 23 formed in a long cross-sectional shape in the vertical direction and combined between the case lower plate 29 and the upper cover 41; and the horizontal section portion 25 protruding long from the vertical section portion 23 in the lateral direction of the vehicle and coupled to the lower side of the frame side member 7.

Furthermore, the horizontal section portion 25 is provided with the sleeve 45 in contact with the lower side of the frame side member 7, and the case mounting bolt 47 passes through the sleeve 45 of the horizontal section portion 25 and is fastened to the lock 59 of the frame side member 7.

Meanwhile, a plurality of partition walls 61 are formed in the vertical section portion 23 of the case side portion 21 to partition the inside of the vertical section portion 23 into a plurality of closed sections 23_C.

The plurality of partition walls 61 provided in the vertical section portion 23 are disposed parallel to each other and spaced from each other in the vertical direction, and one of the partition walls 61 is aligned and disposed on a same horizontal plane as the frame reinforcing panel 57 of the frame side member 7.

That is, as shown in FIG. 6, when one of the partition walls 61 is aligned on a same horizontal plane as the frame reinforcing panel 57 of the frame side member 7, in case the frame side member 7 is deformed by an external impact force and comes into contact with the vertical section portion 23 of the case side portion 21, the load transferred through the frame reinforcing panel 57 is supported by the partition wall 61 of the vertical section portion 23 aligned on the same horizontal plane as the frame reinforcing panel 57, effectively suppressing the continuous deformation of the frame side member 7.

The body side sill 19 is disposed on the outside the frame side member 7, and the side sill reinforcing panels 27 are provided inside the cross section of the body side sill 19 to form at least one closed section 19_C. Furthermore, at least a portion of the area where the side sill reinforcing panels 27 are horizontally disposed is aligned with the frame reinforcing panel 57 of the frame side member 7 on the same horizontal plane.

In the instant case, the load transferred to the frame side member 7 through the side sill reinforcing panels 27 due to deformation of the body side sill 19 is supported by the frame reinforcing panel 57 of the frame side member 7, effectively suppressing the continuous deformation of the body side sill 19.

The configuration of the exemplary embodiment of the present disclosure as described above may be expressed as follows.

That is, the battery pack mounting structure for vehicles of the present disclosure includes: the frame side member 7 disposed long in the front and rear direction on each side of the vehicle to form the chassis frame 3; the battery 15 disposed to be overlapped horizontally on the inside of the two frame side members 7; and the case side portion 21 provided in an L-shaped cross section on the side of the battery case 17 enclosing the battery 15 and coupled to the lower side of the frame side member 7. The frame reinforcing panel 57 is provided inside the frame side member 7 to form a partition in the horizontal direction thereof.

The frame side member 7 forms a closed section including an upper horizontal portion 63 and a lower horizontal portion 65 parallel to the upper and lower sides of the frame reinforcing panel 57, respectively, and the lock 59 to which the case mounting bolt 47 fastened through the case side portion 21 is screwed is supported the lower horizontal portion 65 and the frame reinforcing panel 57.

The lock 59 is fixed in a state with a lower flange 67 thereof coupled to the upper side surface of the lower horizontal portion 65 of the frame side member 7 and the upper side thereof passing through the frame reinforcing panel 57.

The case side portion 21 includes: the vertical section portion 23 combined between the upper cover 41 covering the upper side of the battery 15 and the case lower plate 29 supporting the lower side of the battery 15, and includes a long cross-sectional shape in the vertical direction to form the side of the battery case 17; and the horizontal section portion 25 protruding long from the vertical section portion 23 in the lateral direction of the vehicle and coupled to the lower side of the frame side member 7.

The plurality of partition walls 61 spaced from each other in the vertical direction are provided in the vertical section portion 23, and one of the partition walls 61 is aligned and disposed on the same horizontal plane as the frame reinforcing panel 57 of the frame side member 7.

The body side sill 19 is disposed on the outside the frame side member 7, and the side sill reinforcing panels 27 are provided inside the cross section of the body side sill 19. Furthermore, at least a portion of the area where the side sill reinforcing panels 27 are horizontally disposed is aligned with the frame reinforcing panel 57 of the frame side member 7 and one of the partition walls 61 of the vertical section portion 23 on the same horizontal plane.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery pack mounting structure for a vehicle, the battery pack mounting structure comprising:
    frame side members extending in a front and rear direction on each side of the vehicle to form a chassis frame of the vehicle;
    a battery disposed to be overlapped horizontally on an inside of the frame side members; and
    a battery case enclosing the battery therein,
    wherein a case side portion provided on a side of the battery case is coupled to a lower side of the frame side members,
    wherein the battery case includes:
        an upper cover covering an upper side of the battery; and
        a case lower plate supporting a lower side of the battery, and
    wherein the case side portion includes:
        a vertical section portion combined between the case lower plate and the upper cover and including a predetermined cross-sectional shape in a vertical direction; and
        a horizontal section portion that protrudes from the vertical section portion in a transverse direction of the vehicle and is coupled to the lower side of the frame side members,
    wherein in the battery case, a cooling plate is provided under the case lower plate, a lower side of the cooling plate is covered by an under cover, and the under cover is aligned with a minimum ground clearance, and
    wherein a cover fastening bolt penetrating the under cover and the case lower plate is fastened to the vertical section portion of the case side portion, and a lower end portion of a head of the cover fastening bolt is aligned with the minimum ground clearance.

2. The battery pack mounting structure of claim 1, wherein a lower end portion of the horizontal section portion of the case side portion includes a structure connected in a horizontal direction to an inclined connection portion formed to be inclined downwardly from the vertical section portion, and is aligned with the minimum ground clearance.

3. The battery pack mounting structure of claim 2, wherein a sleeve contacting with the lower side of each of the frame side members is provided on the horizontal section portion, and a case mounting bolt penetrating the sleeve is fastened to the frame side members.

4. The battery pack mounting structure of claim 3, wherein the sleeve includes:
    a protruding spare portion protruding upwards from the horizontal section portion, and an insertion support portion inserted into the horizontal section portion,
wherein the insertion support portion is supported by a plurality of spaced-apart support walls forming the horizontal section portion.

5. The battery pack mounting structure of claim 4, wherein the protruding spare portion protrudes upwards from the horizontal section portion to provide a predetermined gap between the horizontal section portion and the frame side member.

6. The battery pack mounting structure of claim 4, wherein the protruding spare portion of the sleeve is formed to be 7 mm or more than 7 mm.

7. The battery pack mounting structure of claim 6, wherein the insertion support portion of the sleeve is formed to be 15 mm or more than 15 mm.

8. The battery pack mounting structure of claim 4, wherein the lower end portion of the horizontal section portion is provided with a bolt through hole through which a head of the case mounting bolt passes, and the plurality of support walls of the horizontal section portion supporting the sleeve are formed to be in parallel spaced upwards from the lower end portion of the horizontal section portion.

9. The battery pack mounting structure of claim 8, wherein a horizontal length of the horizontal section portion is configured so that an external end portion of the horizontal section portion does not protrude beyond an external end portion of each of the frame side members in a state in which the horizontal section portion is coupled to the lower side of each of the frame side members by the case mounting bolt.

10. The battery pack mounting structure of claim 9, wherein the horizontal length of the horizontal section portion is set to form a head space with a width of 10 to 20 mm around the head of the case mounting bolt in a state in which the horizontal section portion is coupled to the lower side of each of the frame side members by the case mounting bolt.

11. The battery pack mounting structure of claim 10, wherein a head clearance height of 5 to 10 mm is provided between the lower end portion of the horizontal section portion and the head of the case mounting bolt in a state in which the horizontal section portion is coupled to the lower side of each of the frame side members by the case mounting bolt.

12. The battery pack mounting structure of claim 10, wherein the head of the case mounting bolt includes a height of 15 to 20 mm, and a diameter thereof is 30 to 35 mm.

13. The battery pack mounting structure of claim 1, further including a body side sill disposed to be overlapped horizontally on an outside of the frame side members,
wherein a plurality of closed sections are formed inside the body side sill to absorb shock and suppress deformation upon an external impact applied thereto.

14. A battery pack mounting structure for a vehicle, the battery pack mounting structure comprising:
frame side members extending in a front and rear direction on each side of the vehicle to form a chassis frame of the vehicle;
a battery disposed to be overlapped horizontally on an inside of the frame side members; and
a battery case enclosing the battery therein,
wherein a case side portion provided on a side of the battery case is coupled to a lower side of the frame side members,
wherein the battery case includes:
an upper cover covering an upper side of the battery; and
a case lower plate supporting a lower side of the battery, and
wherein the case side portion includes:
a vertical section portion combined between the case lower plate and the upper cover and including a predetermined cross-sectional shape in a vertical direction; and
a horizontal section portion that protrudes from the vertical section portion in a transverse direction of the vehicle and is coupled to the lower side of the frame side members, and
wherein an under cover is provided on a lower side of the battery case, a cover fastening bolt fastened through the under cover is fastened to the vertical section portion of the case side portion, and the under cover, a lower end portion of a head of the cover fastening bolt, and a lower end portion of the horizontal section portion of the case side portion are aligned with a minimum ground clearance.

* * * * *